Patented Mar. 6, 1928.

1,661,871

UNITED STATES PATENT OFFICE.

ARTHUR BINZ AND CURT RÄTH, OF BERLIN, GERMANY.

PROCESS FOR THE PREPARATION OF HETEROCYCLIC ARSENIC COMPOUNDS.

No Drawing. Application filed April 2, 1926, Serial No. 99,379, and in Germany November 4, 1925.

The object of the invention is a process for the preparation of new arsenic compounds which have extraordinary parasitical actions but on the other hand are surprisingly non-poisonous. The compounds are characterized by the fact that one heterocyclic nucleus or two heterocyclic nuclei are connected, by means of arsenic atoms to an aromatic or aliphatic group. There are thus obtained mixed arseno compounds of heterocyclic nature of the general type $$R-As=As-R_1,$$

in which R is a heterocyclic group, either substituted or unsubstituted, and in which $R_1$ may be another heterocyclic, an aromatic, or an aliphatic group.

The preparation of mixed heterocyclic arseno compounds, of this kind consists in condensing a heterocyclic arsine oxide or a heterocyclic arsine halide with a heterocyclic, aromatic, or aliphatic arsine compound, or condensing a heterocyclic arsine compound with a heterocyclic, aromatic, or aliphatic arsine oxide, halide, or similar compound. The reaction may be carried out by reducing a mixture of two heterocyclic arsonic acids or arsine oxides, or reducing a mixture consisting of one heterocyclic arsonic acid or oxide and an aromatic or aliphatic arsonic acid or oxide. The reaction may also be carried out by oxidizing a corresponding mixture of the arsines concerned. Another method is to convert a mixture of a heterocyclic arseno compound and another heterocyclic arseno compound, an aromatic, or an aliphatic arseno compound, to the corresponding mixed arsenic compound by reaction of the components in solution or suspension, if necessary with heating.

It has been found, in carrying out the condensation of arsines with arsine oxides or arsine halides, that the presence of small quantities of mild reducing agents, such as hypophosphorous acid, hypophosphites, etc. promotes the reaction considerably. This is shown by the increased yield.

Initial materials containing substituents which are capable of evolving biological actions, or of influencing the solubility of the products, or having both properties, are used advantageously. Suitable substituents are: halogens, amino groups, hydroxyl groups, carboxyl groups, sulfo groups etc. Substituents which contain hydrogen replaceable by metals may be neutralized with alkali. The substituents may, in turn, be further substituted at that time or may be substituted later. For example, amino groups may be acetylated or substituted by methylene-sulfoxylate.

Mixed arsenic compounds, which have ring substituents in the ortho position to the hetero atom, such as nitrogen have been shown to be especially active.

The heterocyclic arsenic compounds which are used as starting materials in the foregoing process can be obtained from the heterocyclic amino compounds, e. g.—those containing nitrogen, sulphur, oxygen, etc. as hetero members, by diazotizing and then arsenating the diazo compounds by treatment with arsenites or arsenious acid. The heterocyclic arsonic acids obtained in this or other ways are then coverted into arsine oxides, arsines, or symmetrical arseno compounds, as starting materials for the submitted invention, by reduction with sulphurous acid, nascent hydrogen, hydrosulphites, hypophosphorous acid etc.

Our new process is very advantageous as it allows of the production of mixed i. e. unsymmetrical arseno compounds the efficacies of which are much superior to those of the corresponding symmetrical arseno compounds. Various tests have shown for instance that unobjectionable effects are produced upon the bacteria causing the disease to be combated, by using extraordinarily small amounts of the unsymmetrical compounds. In some cases even fractions of those quantities which were required of the corresponding arseno compounds are sufficient for obtaining a good result. Often a single application of these unsymmetrical arseno compounds succeeds in killing off all the bacteria for instance trypanosomes without any recidivation accuring. The superiority of the unsymmetrical arseno compounds produced according to our invention may be seen for instance from the following comparative tests made with mice infected previously with trypanosoma nagana.

On treating the mice thus infected with the well known arseno compound arsphenamine:

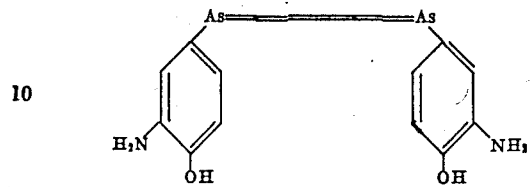

the latter has shown an index of 1:9, whilst the symmetrical arseno compound 2-hydroxy-5-pyridyl arsonic acid

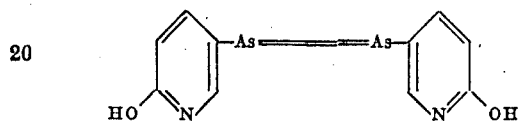

had the index 1:25.

The arseno compound in accordance with the present invention

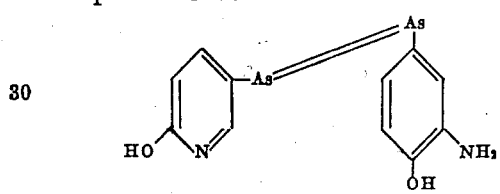

which is composed for instance of both these components and produced according to Example 4, has an index 1:75.

By index is meant the relation of the amount exerting a healing effect (dosis curativa) to the quantity which the animals treated therewith are just able to tolerate (dosis tolerata).

*Example 1.*

One mole of ana-quinoline-arsonic acid and one mole of ortho-quinoline-arsonic acid are reduced, in aqueous solution at 70° C., by the addition of hypophosphorous acid. The asymmetrical arseno compound

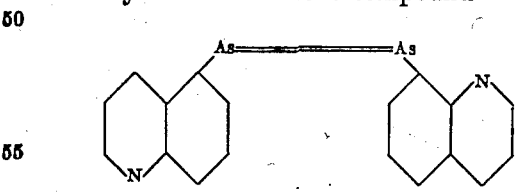

is obtained as a yellowish-red amorphous powder.

*Example 2.*

An aqueous solution of equimolecular quantities of 2-hydroxy-5-pyridyl-arsonic acid and of ortho-quinoline-arsonic acid is acidified with hydrochloric acid. The arsonic acids are then reduced, by addition of sodium hypophosphite, with heating, to form the mixed arseno compound:

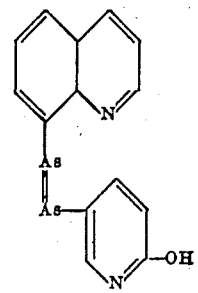

The new compound is a yellowish-red amorphous powder, soluble in alkali solution.

*Example 3.*

An aqueous solution of equimolecular quantities of ortho-benzarsonic acid and 2-hydroxy-5-pyridyl-arsonic acid is reduced by addition of hypophosphorous acid with heating. The new compound

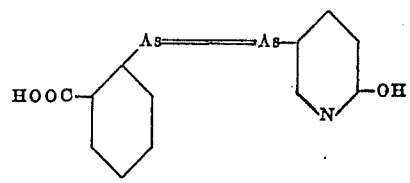

is also an amorphous yellowish-red powder, soluble in alkali solution and alkali-metal carbonate. By treatment with a molecule of caustic soda in solution the water-soluble, sodium salt of the compound is obtained.

*Example 4.*

26.3 gms. of 3-nitro-4-hydroxy-phenyl-arsonic acid and 21.9 gms. of 2-hydroxy-5-pyridyl-arsonic acid are dissolved in 0.9 liter of water with addition of about 30 cc. of 10 normal caustic soda solution. To this solution is added, with stirring, a mixture of 100 gms. magnesium chloride and 600 gms. sodium hydrosulphite in 2.6 liters of water. The entire mixture is heated at 60° C. for about 2 to 3 hours with thorough agitation. Thereupon the asymmetric arsenic compound

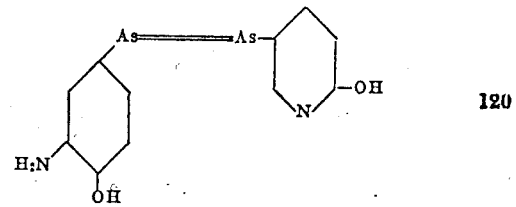

precipitates as an amorphous bright yellow powder. The substance is filtered, washed with hydrochloric acid, alcohol, and ether and then recovered as the dichloro-hydroxide. By moistening with small quantities of concentrated sodium hydroxide solution a dark colored homogenous mass is obtained, which will dissolve in water.

Example 5.

The aqueous solution of the oxide obtained from 21 grams of 2-hydroxy-5-pyridyl-arsonic acid is treated with the hydrochloric acid solution of the arsine obtained from the equivalent quantity of 3-amino-4-hydroxy-phenyl-arsonic acid. The compound precipitates as a yellow precipitate. A small addition of sodium hypophosphite to the cold reaction mixture raises the yield to nearly the theoretical. The arsenic compound obtained in this way is purified and dried by washing with concentrated hydrochloric acid, alcohol and ether.

Example 6.

Equimolecular quantities of the $4.4^1$-dihydroxy-$3.3^1$-diamino-arsenobenzene and of $2.2^1$-$3^1.5$-diarseno-pyridyl are allowed to react, in aqueous suspension preferably at a high temperature. Both components undergo a change with the formation of the asymmetrical arseno compound. The working up and purification of the product is the same as in Example 4.

Example 7.

2.5 grams of the asymmetrical arseno compound as obtained in Example 4 are floated on 25 cc. water and treated with a solution of 2.3 grams sodium sulfoxylate in 13 cc. water. After standing several hours with frequent shaking, the yellow precipitate is washed with water and dried by washing with alcohol-ether. 1 mol. of the condensation product

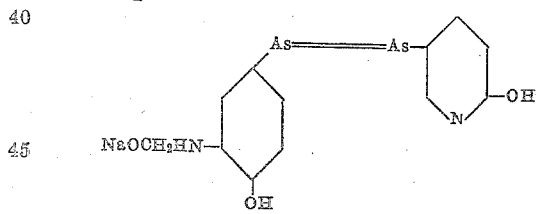

is obtained. This is easily soluble in water with addition of 2 mol. caustic soda solution. The substance can be purified by dissolving in dilute sodium hydroxide solution and reprecipitating with an equimolecular quantity of hydrochloric acid. On stirring the alkaline solution of the new compound into alcohol the sodium salt precipitates in yellowish-red flakes. It is then filtered and dried with alcohol-ether. The sodium salt obtained in this way is easily soluble in water.

What we claim is:

1. Process for the preparation of organic arsenic compounds of the type $R-As=As-R_1$, wherein R is a heterocyclic group and $R_1$ is a heterocyclic, isocyclic or open chain group, which comprises condensing an arsenic compound of R with an arsenic compound of $R_1$.

2. Process for the preparation of organic arsenic compounds of the type $R-As=As-R_1$, wherein R is a heterocyclic group and $R_1$ is a heterocyclic, isocyclic or open chain group, which comprises condensing a derivative of the arsinic acid of R with a derivative of the arsinic acid of $R_1$.

3. Process for the preparation of organic arsenic compounds of the type $R-As=As-R_1$, wherein R is a heterocyclic group and $R_1$ is a heterocyclic, isocyclic or open chain group, which comprises reducing a mixture comprising an arsine oxide of R and an arsine oxide of $R_1$.

4. Process for the preparation of organic arsenic compounds of the type $R-As=As-R_1$, wherein R is a heterocyclic group and $R_1$ is a heterocyclic, isocyclic or open chain group, which comprises condensing an arsenic compound of R with an arsenic compound of $R_1$ in the presence of a reducing agent.

5. Process for the preparation of organic arsenic compounds of the type $R-As=As-R_1$, wherein R is a heterocyclic group and $R_1$ is a heterocyclic, isocyclic or open chain group, which comprises condensing an arsenic compound of R with an arsenic compound of $R_1$ in the presence of hypophosphorous acid.

6. A product of manufacture comprising an arsenic compound of the type

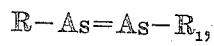

wherein R is a heterocyclic group and $R_1$ is a heterocyclic, isocyclic or open chain group.

7. A product of manufacture comprising an arsenic compound of the type

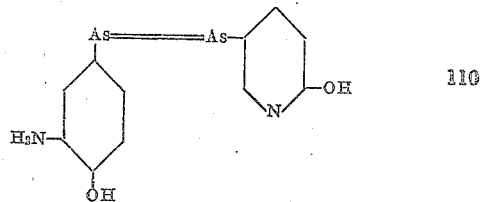

Signed at Berlin, in the county of Brandenburg and State of Prussia, this 17th day of March, A. D. 1926.

ARTHUR BINZ.
CURT RÄTH.